Feb. 28, 1967 P. B. BRYK ETAL 3,306,708
METHOD FOR OBTAINING ELEMENTAL SULPHUR
FROM PYRITE OR PYRITE CONCENTRATES
Filed Feb. 10, 1965
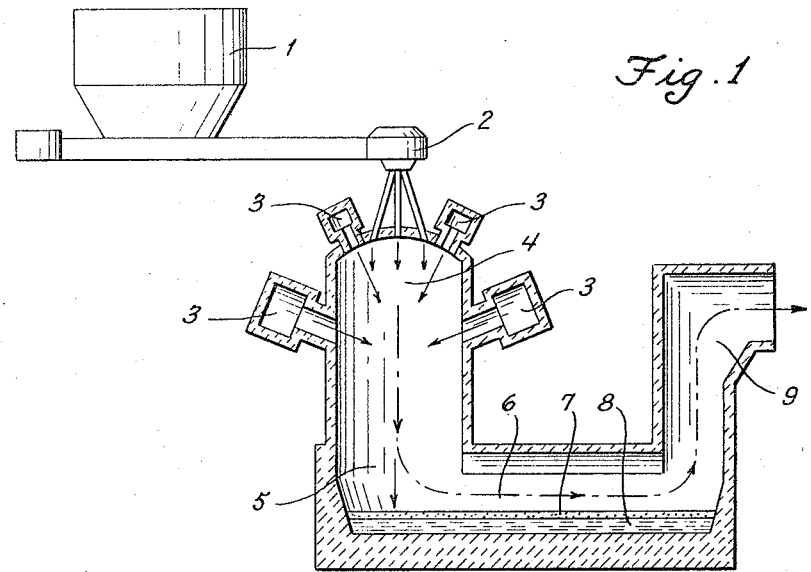
Fig. 1
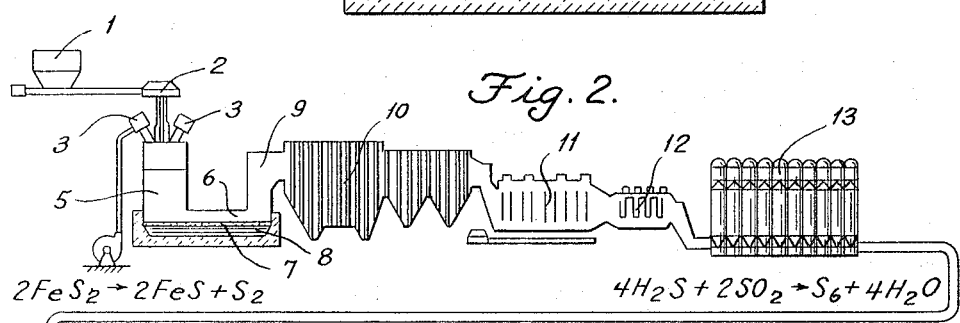
Fig. 2
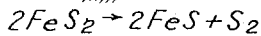
$2FeS_2 \rightarrow 2FeS + S_2$
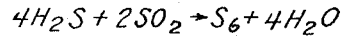
$4H_2S + 2SO_2 \rightarrow S_6 + 4H_2O$
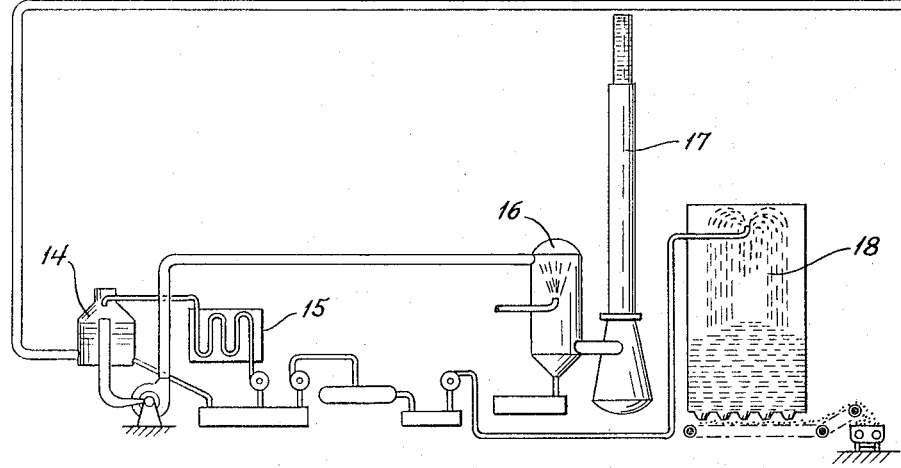
PETRI BALDUR BRYK
and INVENTORS.
JORMA BRUNO HONKASALO
BY
Albert M. Parker
ATTORNEY.

United States Patent Office 3,306,708
Patented Feb. 28, 1967

3,306,708
METHOD FOR OBTAINING ELEMENTAL SULPHUR FROM PYRITE OR PYRITE CONCENTRATES
Petri Baldur Bryk, I. Kaivopuisto 3, and Jorma Bruno Honkasalo, Pohjoiskaari 39, both of Helsinki, Finland
Filed Feb. 10, 1965, Ser. No. 431,595
Claims priority, application Finland, Oct. 1, 1959, 1,584/59
13 Claims. (Cl. 23—224)

This application is a continuation-in-part of application Ser. No. 57,379, filed September 21, 1960, now abandoned, and of application Ser. No. 308,837, filed September 13, 1963, now abandoned.

This invention relates to a method for obtaining elemental sulphur and iron sulfide from pyrite or pyrite concentrates by heating them with a non-oxidizing gas.

Conventionally pyrite is roasted in oxidizing conditions, in which case the sulphur content of the pyrite burns to $SO_2$, which is utilized in the sulphite pulp industry and in the production of sulphuric acid. From the point of view of marketing, storing and transport, however, it is often desirable to obtain the sulphur as elemental sulphur.

For this purpose there are methods according to which the pyrite or the pyrite concentrates are heated up to temperatures in which the pyrite will decompose according to the formula $$FeS_2 = FeS + S$$

in which case about half of the sulphur is recovered as elemental sulphur and the remaining part is in the iron sulfide, FeS, thus produced.

For the last mentioned purpose crucible or muffle heating methods have been proposed, which methods, however, are hampered by low thermal conductivity of the finely divided pyrite, whereby the effect of these methods remains poor, and there is danger of overheating and sintering, and the fuel consumption becomes too great.

There is another method, according to which pyrite is heated indirectly by burning producer gas, which is burnt together with air in combustion chambers surrounding the apparatus, whereby sulphur will separate from the pyrite, whereafter the gases, which no longer contain oxygen, are allowed to heat the pyrite bed directly and to transport the sulphur vapor to a sulphur recovery chamber. The remaining product, which contains FeS, is then roasted in order to recover the sulphur as $SO_2$ and iron as $Fe_2O_3$. The cinders are consequently obtained in very finely divided state. In this method the melting of the FeS is purposely avoided.

When separating elemental sulphur according to these methods, the FeS resulting from the method has the same particle size as the pyrite or pyrite concentrate used as raw material. When the FeS is afterwards roasted, the cinders produced by the roasting are also in finely divided form and thus cause difficulties when used as iron ore.

The purpose of this invention is to provide a method of treating pyrite or pyrite concentrate whereby, using direct heating, one part of the sulphur is obtained in elemental form, and the FeS formed is in a molten state.

The essential features of this invention are: finely divided pyrite or pyrite concentrate is treated with substantially non-oxidizing gases at an elevated temperature to cause elemental sulphur to separate from the raw material, the heating is performed while the raw material is suspended in the heating gas, the flow of the suspension is downwards, and the temperature and the amount of the heating gases is such as to melt the finely divided raw material in the suspension and to bring such melt to substantially the same temperature as the heating gases.

- The molten material is collected at the bottom of the chamber or furnace in which such heating takes place, the gases being removed from the chamber in a suitable manner.

In the described preferred method the gases are caused to turn and flow horizontally, thereby causing the molten particles to be projected into an accumulated matte of molten particles. This can be effectively performed by forcing the suspension to change its direction of flow about 90°. Thus a furnace suitable for this purpose comprises a vertical part in which the suspension is led downwards, as described, and a horizontal part for accumulating the molten matte. The furnace here shown is generally similar to that described in U.S. Patent No. 2,506,557, although its manner of operation is different, as will become apparent herein.

The method according to this invention is described more in detail in the following description referring to the accompanied schematic drawings in which FIG. 1 is a sectional view of the furnace; and
FIG. 2 is a flow sheet of the smelting of pyrite and recovering of the elemental sulphur.

Finely divided pyrite or pyrite concentrate is fed from a surge bin 1 to a material distributor 2, which feeds the finely divided raw material through one or more material-feeding ports in the upper part 4 of a vertical reaction shaft. Burners 3 in which fuel and air are fed and in which combustion takes place substantially completely, are situated outwardly of the reaction shaft proper at the upper part 4 so that the intermixing of combustion gases and the solid material to form a suspension of the solid material in the downflowing gas is rapid and complete.

Heat exchange for smelting takes place during that distance the suspension of combustion gases and the finely divided material travel from the upper part 4 of the reaction shaft downwards to the point 5 in the lower part of the shaft. The temperature of the combustion gases entering into the shaft from burners 3 is typically about 1800° C., the temperature of the suspension in the lower part 5 of the shaft being about 1250–1200° C. At the bottom of the settling part 6 of the furnace is a bath, which comprises an upper layer 7 and a lower layer 8. The temperature of the lower layer 8, which is a molten matte of FeS, is normally about 1100–1200° C.; and the temperature of the upper layer 7, which is composed of slag, is about 1200–1250° C., such temperatures depending somewhat upon the composition of the slag.

The temperature of the non-oxidizing gases used in the furnace depends upon the composition of the slag or upon the composition of the gangue in the pyrite concentrate. The melting point of pure FeS is 1189° C.; with the right amount of FeO in the FeS, the melting point of FeS can be brought down to as low as 940° C., as will be described. The working temperature of the reaction shaft must be about 50–150° C. above the melting point of the mixture of FeS and FeO. Such working temperature can be calculated from the melting point of the mixture of FeS and FeO resulting from the raw material used.

At the lower part 5 of the shaft of the furnace the flow direction of the gases is turned and the molten particles continue directly downwards and strike against the surface of the accumulated bath 7, 8. The combustion gases and the volatilized elemental sulphur entrained therein continue their flow in the horizontal settling part 6 of the furnace and leave the furnace through a vertical exhaust shaft 9 to a high pressure waste heat boiler 10 where they are cooled down to a temperature of about 300–350° C. From the boiler, gases flow to an electric precipitator 11 and further to a low pressure boiler 12 and then to a catalyst chamber 13 and to a sulphur recovery means comprising, for example, a sulphur scrubber 14 and a sulphur cooler 15 for circulated liquid sulphur, a waste gas washer 16, a chimney 17 for the waste gases, and a storage bin 18 in which elemental sulphur is collected. All these means are known per se and generally used in the art.

The layer of molten slag 7, which accumulates in the bottom of the furnace, comes from the gangue in the concentrate and from other materials which may be added, if desired, for lowering the melting point and viscosity of the slag. The molten iron sulfide is tapped from the furnace and is brought into particle form by subjecting it to water and air. Alternatively, the molten iron sulfide may be cast in molds, the resulting cast shapes after solidification and cooling being crushed to form granules of the desired size. An added, special advantage in the use of the coarser iron sulfide resulting from either of such methods of granulation is that after roasting it gives coarser cinders, iron oxide, which is better for use as raw material for iron.

According to the method of this invention the heat exchange, occurring in the suspension of the pyrite particles and the heated combustion gas, is very effective. As a result, a very high production capacity is achieved. Further, it must be mentioned that by using a temperature high enough for obtaining a liquid FeS product, all difficulties due to sintering and sticking together of FeS particles are avoided. As the heating in suspension is carried out in a vertical shaft in a downward direction, a very effective separation of the molten FeS particles or drops and gas is achieved, particularly when the gas is forced to alter its direction of flow, as in the disclosed embodiment, in such manner as to make the liquid particles or drops strike the surface of the bath.

Also, in accordance with the method of the invention, a relatively greater part of the sulphur from the pyrite can be recovered as elemental sulphur than can be achieved in treatments carried out at lower temperatures, as has previously been done. This is because in such prior, low temperature methods, the remaining iron sulfide does not correspond to the formula FeS, but contains more sulphur. The higher the temperature of reaction, the nearer the theoretical formula FeS is approached. Thus, in addition to the thermal decomposition of pyrite in accordance with this invention, it is possible to convert part of the sulphur which otherwise remain bound to the FeS into elemental sulphur, as will be described further on.

Further, an additional advantage of this method is that it is easy to convert the liquid iron sulfide, by known and cheap methods, to a product of such particle size that it is easy to roast and that it is advantageous to use the roasted product as ore in the production of iron and steel. It is known, for instance, that in modern fluidized bed roasting furnaces the roasting capacity is greater when coarser material is used than when roasting flotation concentrates. The greater particle size is very important from the point of view of using the cinders as ore for iron and steel production. Practice has shown that the cinders from flotation pyrite are so finely divided that they bring down the capacity of the sintering plant because of the increased quantity of fines which must be returned to the sintering process. A much smaller proportion of fines requiring re-processing is obtained when sintering ore with coarse particle size as the particles according to this invention.

The value of the cinders plays a considerable role in the economy of the use of pyrite. As a result, the production of iron ore of coarse particle size from flotation concentrate when such concentrate is treated according to the method of the invention is a considerable advantage.

A further advantage of such method is that it makes it possible to separate from the FeS certain metal sulfides which have a considerable vapor pressure at temperatures about 1100–1200° C. such as As, Pb, and Zn. The removal of these with the combustion gases is essential when the cinders are used directly, without further purification, as iron ore.

As above set forth, it is essential to the method of the invention that the gas employed in the reaction be non-oxidizing. Thus with a reaction shaft as shown, the fuel will have been completed to such an extent that during the transfer of heat from the gas to the pyrite particles the particles will not be oxidized to any appreciable degree. Thus during such heat transfer and throughout the downward travel of the suspension of the particles in the gas, the particles melted and decomposed to FeS and S, the S remaining unoxidized and in elemental form. The recovery of elemental sulphur may be increased by taking sulphur from iron sulfide with the aid of suitable reactions, which are combined in this method and partly take place in the same apparatus as the thermal decomposition of the pyrite.

To prevent oxidation of the raw and resulting materials during the described heat transfer, the fuel and combustion air may be made to react with each other before the raw material is suspended in the gas, or at least before the ignition temperature of sulphur has been reached in the suspension. In other words, in the thermal decomposition of pyrite no oxygen is allowed to be present in the combustion gases in that stage in which it might oxidize pyrite or its decomposition products. In this connection, oxidation can also be prevented by providing moisture on the surface of the particles of the raw material. If the raw material contains a certain amount of water—practice has shown that such small percentages as 0.1 to 0.5 percent are sufficient—then in the beginning of the heating a certain time is consumed in evaporation of the water and dispersing the steam cover surrounding the raw material. During this time the raw material is protected against oxidation.

In the method described above, about one-half of the sulphur contained in the pyrite remains in the matte and the rest is separated simultaneously in the outflowing combustion gas as elemental sulphur. In accordance with the invention, the quantity of elemental sulphur recovered can, however, be increased by utilizing certain chemical reactions, which make it possible to obtain elemental sulphur also from the iron sulfide (FeS), thereby further increasing the recovery of elemental sulphur. As an example, when hydrogen-containing fuel, such as oil, is used in the process, the combustion gases obtain considerable quantities of water vapor. Also, the raw material may contain small amounts of moisture. It is known that $H_2O$ reacts with FeS according to the formula $$FeS + H_2O = FeO + H_2S$$

The reaction mentioned is an equilibrium reaction and the equilibrium is shifted to the right with increasing temperatures. With elevated temperatures, such as those employed in the present method, sufficient $H_2S$ is formed to make it a valuable by-product.

It is also possible to use fuel without any hydrogen content, in which case the water vapor needed for the process can be supplied as moisture in the raw material or directly as steam. Previously, there have been several attempts to carry out and utilize this reaction. As an example of such attempts, the so-called Hall method may be cited. The desired result has, however, not been obtained in practice. According to the present method, as previously stated, the temperatures used are high enough to make it feasible to carry out this reaction.

The $H_2S$ formed in lower temperature reactions can be converted into elemental sulphur by using methods, in themselves previously known, such as the Claus method, or methods based upon the Claus method, involving reacting the $H_2S$ with $O_2$ or with $SO_2$ gas obtained, for example, from the roasting of FeS. Thus:

$$6H_2S + 3O_2 = 6H_2O + 3S_2$$

$$4H_2S + 2SO_2 = 4H_2O + 3S_2$$

According to the last mentioned reaction, $SO_2$ can be used as an oxidizer for the hydrogen sulfide to convert the hydrogen sulfide into elemental sulphur and water.

Accordingly, it is possible in this manner to obtain more elemental sulphur from the sulphur content of the original raw material than is possible with mere thermal decomposition of the pyrite. Thus $SO_2$ gas obtained from the later treatment of iron sulfide by means of roasting can be used to oxidize hydrogen sulfide as shown in the second reaction above. In this last mentioned oxidizing treatment also, the sulphur in $SO_2$ gases is obtained as elemental sulphur.

Because the sulphur content in $SO_2$ gases can be recovered as elemental sulphur, an amount of $SO_2$ gases necessary for oxidizing hydrogen sulfide can be produced by regulating the fuel/air ratio (still close to stoichiometric burning) in the burners 3 such that a necessary amount of $SO_2$ is produced upon decomposition of the pyrites in the suspension thereof in the heating gas to work as an oxygen carrier for oxidizing $H_2S$ in the catalyzer in which $SO_2$ and $H_2S$ react together to produce elemental sulphur in the later part of the whole procedure. Thus the oxygen necessary to oxidize $H_2S$ can be supplied in the beginning of the process, in the form of the $O_2$ in $SO_2$, without making the heating gas as a whole effectively oxidizing. One could say that the elemental sulphur produced acts, in a form of $SO_2$, as a means to carry and subsequently surrender oxygen. The above mentioned reaction between $SO_2$ and $H_2S$, suitably employed in the method of the invention, increases the production of elemental sulphur compared to that obtained with only the thermal decomposition of pyrite. The gases employed are properly termed non-oxidizing (non-roasting) in spite of the fact that a small amount of $SO_2$ is permitted. In this case it is merely a question of another alternative and of an easier way to get $SO_2$ for decomposing $H_2S$ into elemental sulphur.

How much sulphur in the form of hydrogen sulfide can be removed with aid of water vapor from iron sulfide depends on the reaction equilibrium, as mentioned above, and on the solubility of the thus obtained iron oxide in the FeS-matte; as we have seen, the FeO lowers the melting point of such FeS-matte. Thus, with aid of water vapor, it is possible to convert only so much iron sulfide into $H_2S$ and FeO as is necessary for the remaining FeS to dissolve all the FeO. The melting point of pure FeS is lowered from 1189° C. down to 940° C. at the eutectic point when FeO is added. A greater amount of added FeO affects the melting temperature by elevating it, and adversely affects the FeS-FeO mixture by increasing its viscosity. The area of the system of iron-sulphur-oxygen (Fe-S-O) in which the treatment takes place has been discussed in the literature, by, e.g., D. C. Hilty and W. Crafts, Journal of Metals, 1952, pp. 1307–1312. The oxygen added into the molten FeS in the form of FeO is bound to the Fe; the method remains non-oxidizing. Such FeO acts favorably to the whole result, as we have seen, by lowering the melting point of the molten FeS-FeO matte. Thus the oxygen bound into FeO must be considered as a chemical added to the molten FeS similarly as the slag-forming additives improve the slag from the gangue in the raw material.

As will be seen from the above, the outstanding features of the method in accordance with the invention are:

Fine-grained pyrite or pyrite concentrate is employed as the raw material. In a preferred embodiment of the method such pyrite is dried before treatment in accordance with the method of the invention. Such fine-grained pyrite is then heated by combustion gases to a temperature sufficiently high to decompose the pyrite and to yield its labile sulphur. The remaining FeS is obtained in liquid form.

The combustion gases and the sulphur vapor entrained therein are cooled, and the elemental sulphur is separated from the process gases. The liquid FeS is granulated and is then roasted, yielding a coarse-grained iron oxide product and roasting gas rich in $SO_2$. Heat from the reaction furnace, from the process gases, and from the roasting process is recovered by heat exchange to produce steam which is utilized for the generation of electric power.

The following examples will further illustrate the method of the invention. It is to be understood that such examples are for the purpose of illustration, the scope of the invention being defined by the claims.

*Example 1*

The test smelting was carried out in a furnace containing a vertical shaft 4 and a lower horizontal settler part 6. The furnace shaft 4 is 1.2 m. in diameter and 5.2 in height; the lower settler part is 5.2 m. in length and 1.2 m. in breadth, and about 1 m. in height.

The test material was pyrite concentrate containing 46.20% Fe and 52.5% S by weight. The heat for the process was produced by burning oil in a combustion chamber connected with the upper part of the shaft. Ratio of air and oil was 11 $Nm.^3$ air per 1 kilo of oil. (1 $Nm.^3$ as 1 cubic meter gas in a temperatuure of 0° C. and 760 mm. Hg pressure (Normal cubic meter).) During the test run which was continued for several weeks, 1000 kg./h. concentrate was fed into the furnace from the top of the shaft. The consumption of fuel oil was 207 kg./h. and that of air 2288 $Nm.^3$/h. On the average 695 kg./h. FeS matte, 55 kg./h. slag, 2531 $Nm.^3$/h. gases were exhausted from the furnace containing 20 kg./h. fuel dust. These gases left the furnace at 1250° C. temperature and after cooling and dust removal, they were led into a conventional catalyzer to decompose the gaseous sulphur-bearing compounds. After the elemental sulphur was separated from the gas, the gases were cleaned at first in a boiler type collar and then in an electric precipitator.

During this test, of the sulphur content of the pyrite fed in, about 40% remained in the matte and about 60% was discharged in furnace gases, mainly as elemental sulphur and partly as various sulphur bearing compounds.

Elemental sulphur was recovered at a rate of 248 kg./h.

In this connection it can be mentioned that 33% of the zinc contained in the feed remained in the matte. Further, the matte contained only 3% of the arsenic fed into the furnace.

*Example 2*

This method was employed in a plant with a capacity for treating 1000 metric tons of pyrites per day. The furnace used, including gas treatment and sulphur recovering equipment, corresponds exactly to the flow sheet shown in FIG. 2. The furnace was charged with 36 metric tons per hour of dried pyrite having the following composition and screen analysis:

| Chemical composition: | Percent |
|---|---|
| S | 52.11 |
| Fe | 45.62 |
| $SiO_2$ | 0.75 |
| CaO | 0.27 |
| MgO | 0.10 |
| $Al_2O_3$ | 0.2 |
| Zn | 0.12 |
| Cu | 0.05 |
| As | 0.05 |

Screen analysis (Tyler standard screen), mesh:

| | Percent |
|---|---|
| −65 | 100.0 |
| −100 | 97.2 |
| −150 | 85.0 |
| −200 | 69.0 |

Into the burners 3 on top of the furnace, 5.4 tons per hour of bunker C oil and 63,000 $Nm.^3$/h. air was introduced. The temperature of the gases in the exhaust shaft 9 was 1240° C. The temperature of the slag layer 7 was 1210° C. and of the matte layer 8, 1170° C. The gases, cooled down in the boiler 10 to a temperature of 320°

C., were cleaned in the electric precipitator 11, and in the boiler 12, the temperature being further lowered to 280° C.

In addition to sulphur vapor, $H_2S$ and $SO_2$, generated at higher temperatures, were found in the gases. The $H_2S$ and $SO_2$ react in the catalyst chamber 13 and to form elemental sulphur. The sulphur was separated from the gases in the sulphur scrubber 14 by spraying molten sulphur in the gases at a temperature of 125° C. The amount of circulating sulphur was high enough to cool down the gases and to condense the sulphur vapor. The cooling of the circulating molten sulphur took place in the appartus 15. The final purifying and cooling of the gases took place in the tower 16 by means of a water shower. The amount of sulphur pumped into the storage bin 18 was 9.0 tons per hour.

FeS-matte tapped from the furnace was granulated in water, and its chemical composition and screen analysis was as follows:

Chemical compostion: Percent
S _____ 27.0
Fe _____ 63.3
O _____ 5.7
Zn _____ 0.04
Cu _____ 0.06
As _____ 0.003

Screen analysis
(Tyler standard screen), mesh: Percent
−4 _____ 100.0
−6 _____ 98.0
−8 _____ 95.6
−10 _____ 94.8
−14 _____ 73.8
−20 _____ 48.4
−28 _____ 25.9
−35 _____ 11.8
−48 _____ 3.5
−65 _____ 1.5
−100 _____ 1.0

This analysis shows that the amount of zinc is considerably lower in the matte than in the pyrite concentrate. Zinc has been enriched in the flue dust from the electric precipitator 11. The amount of arsenic is lowered to a fraction of its original content. Arsenic is found in the recovered sulphur from which it is easy to remove, if desired. The obtained granulated FeS-matte was then roasted in a fluidized bed furnace. The screen analysis of the iron oxide product was about the same as that of matte; the amount of fines, however, somewhat increased.

*Example 3*

Pyrite concentrate in finely divided form having a grain size such that 70% by weight passed through a 200-mesh screen was dried in a rotary kiln by means of hot combustion gases. Such concentrate had the following composition:

Percent by weight
S _____ 52
Fe _____ 46
$SiO_2$ _____ About 1.5
As _____ About 0.06
Cu _____ About 0.05
Zn _____ About 0.05

Thermal decomposition and smelting of the pyrite was effected in a vertical shaft furnace having a diameter of 5.5 m. and a height of 10 m. The concentrate was fed into the top of the furnace, as in FIG. 1, and was then entrained in combustion gases likewise fed into the furnace as in FIG. 1. The vertical shaft formed the actual reaction space where the heating of the pyrite and the subsequent reactions took place in suspension.

A horizontal rectangular furnace was connected to the bottom of the vertical shaft furnace as in FIG. 1. A molten bath was formed at the bottom of the vertical shaft furnace and in the horizontal furnace connected thereto. Such molten bath was composed of iron sulfide (FeS) in which some iron oxide was dissolved. The gangue left in the concentrate formed slag with separated on the surface of the molten FeS-matte. The liquid FeS was tapped from the furnace and granulated in water. The grain size of the granulated product was about 4 mm. and smaller. There were no very small grains, that is, dustlike material formed during granulation.

The fuel employed in the burners 3 was bunker C fuel oil which burned substantially stoichiometrically, that is, completely in the burners yielding combustion gases at about 1800° C. containing mainly $CO_2$, $H_2O$, and $N_2$. In addition to these components, small amounts of CO, $H_2$, and $O_2$ are present as a result of dissociation; the $O_2$ content of the gases is so small, however, that the gases are substantially non-oxidizing.

The furnace was charged with 1000 tons per day of the above pyrite concentrate, and yielded 264 tons per day of volatile sulphur. When purified, the sulphur yield was 250 tons per day. The balance of the 528 tons of S present in the pyrite raw material, about 200 tons, remained in the FeS product (granulated FeS-matte and flue dust) and the remainder was in the exit gases. Thus a total of 85% by weight of the original sulphur content in the furnace charge was recovered as elemental sulphur or as FeS product.

The quality of the sulphur was very high, the average monthly analysis showing the following impurities:

Percent by weight
As _____ 0.005
Se _____ 0.004
Ash _____ 0.015
Ash _____ 0.015

The sulphur was bright in color, indicating that its carbon content was very low. No organic components have been found in the sulphur. The low arensic content is achieved by washing the sulphur product with $Ca(OH)_2$ in autoclaves.

Although a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art.

What is claimed is:

1. The method of obtaining elemental sulphur and molten iron sulfide from pyrite, $FeS_2$, which comprises finely dividing said pyrite to form gas suspendable particles, directing a stream of substantially non-oxidizing gas containing at most only traces of $SO_2$ and $O_2$ heated to a temperature markedly above 1200° C. downwardly in a confined path in a reaction chamber, feeding said thus formed particles of finely divided pyrite into said stream of heated substantially non-oxidizing gas so as to form a downwardly flowing suspension of said finely divided pyrite in said gas, whereby the particles are heated by the gas and decompose under non-oxidizing conditions into FeS and volatilized elemental S, separating the volatilized elemental sulphur from the thus produced FeS, maintaining the temperature of the gas at least slightly above the melting point of FeS throughout said downward path, including the lower end thereof, and collecting the thus produced FeS in molten form as a matte at the lower end of said downward path of the gas in the reaction chamber.

2. A method as in claim 1, wherein the substantially non-oxidizing gas is a mixture of combustion gases, and which comprises forming said combustion gases by burning a fuel substantially stoichiometrically so as to remove substantially all of the free oxygen from the combustion gases, and thereafter feeding said finely divided pyrite into said flow of combustion gases.

3. A method as in claim 1, which comprises feeding said finely divided pyrites into said flow of combustion gases to bring the same together while said combustion gases contain a small amount of oxygen, and consuming said oxygen in the combustion reaction before the temperature within said path reaches the ignition temperature of said finely divided pyrite.

4. A method as in claim 1, which comprises feeding said finely divided pyrites in a moisture-containing condition into said flow of combustion gases to bring the same together while said combustion gases contain oxygen, and consuming said oxygen in the combustion reaction before the temperature within said path reaches the ignition temperature of said finely divided pyrite.

5. A method as in claim 1, which comprises diverting the gas, with its entrained volatilized sulphur and liquid FeS, from its downward flow adjacent the lower end of the reaction chamber into a confined horizontal path, and collecting the matte of FeS beneath such horizontal path of the diverted gas in addition to the matte collected at the lower end of the downward path of the gas in the reaction chamber.

6. A method as in claim 1, which comprises cooling the molten FeS collected as a matte to cause it to solidify, and comminuting the solidified FeS so that the predominant part thereof has particle sizes between 4 and 35 mesh on a Tyler standard screen.

7. A method as in claim 6, wherein the comminution of the solidified FeS is effected by crushing it.

8. A method as in claim 1, which comprises granulating said molten FeS with air and water.

9. A method as in claim 1, which comprises granulating said molten FeS with water.

10. A method as in claim 1, wherein the substantially non-oxidizing gas is a mixture of combustion gases containing water vapor, and comprising reacting a part of the FeS formed by the decomposition of the pyrite with said water vapor in the combustion gases to form iron oxide and hydrogen sulfide, wherein the matte collected at the lower end of said downward path of the gas includes said thus formed iron oxide in molten form, and wherein the gases at the lower end of said downward path of the gas in the reaction chamber contains said thus formed hydrogen sulfide as well as elemental sulphur, treating said last named gases in the presence of a catalyst to convert the hydrogen sulfide to elemental sulphur and water, and separately recovering elemental sulphur and said molten iron sulfide and iron oxide as a mixture.

11. A method as in claim 10, which comprises diverting the gas, with its entrained volatilized sulphur, hydrogen sulfide, liquid FeS, and FeO from its downward flow adjacent the lower end of the reaction chamber into a confined horizontal path, and collecting the matte including molten iron sulfide and iron oxide beneath such horizontal path of the diverted gas in addition to the matte collected at the lower end of the downward path of the gas in the reaction chamber.

12. A method as in claim 10, which comprises oxidizing to $SO_2$ a part of the elemental sulphur produced by the reaction, and reacting in the presence of a catalyst such $SO_2$ with the $H_2S$ formed by the reaction to produce elemental sulphur and water.

13. A method as in claim 10, which comprises roasting the mixture of iron sulfide and iron oxide collected in said matte, collecting the $SO_2$ gas resulting from said roasting, and reacting in the presence of a catalyst such $SO_2$ with the $H_2S$ formed by the reaction to produce elemental sulphur and water.

References Cited by the Examiner

UNITED STATES PATENTS

| | | | |
|---|---|---|---|
| 1,182,951 | 5/1916 | Wierum | 23—226 X |
| 1,917,687 | 7/1933 | Bacon et al. | 23—226 |
| 2,058,480 | 10/1936 | McCallum et al. | 23—224 X |
| 2,530,630 | 11/1950 | Renken | 23—226 |
| 2,869,999 | 1/1959 | Rosenquist | 75—6 |
| 2,910,348 | 10/1959 | Kuss et al. | 23—224 |

FOREIGN PATENTS

| | | |
|---|---|---|
| 525,481 | 5/1956 | Canada. |
| 540,682 | 5/1957 | Canada. |

OSCAR R. VERTIZ, *Primary Examiner.*

A. J. GREIF, *Assistant Examiner.*